Oct. 18, 1938.  E. A. HARTY  2,133,745
COPPER OXIDE RECTIFYING ELEMENT
Filed Nov. 19, 1935
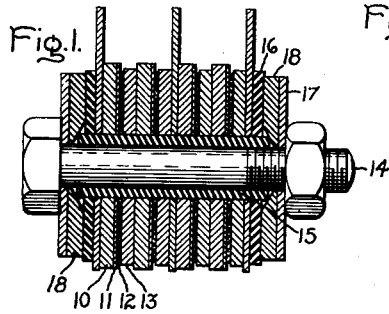
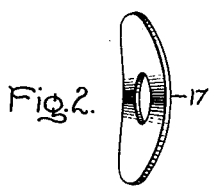
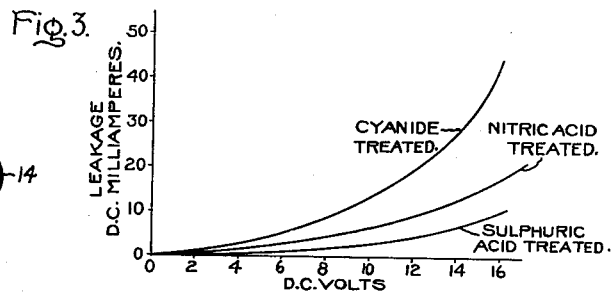
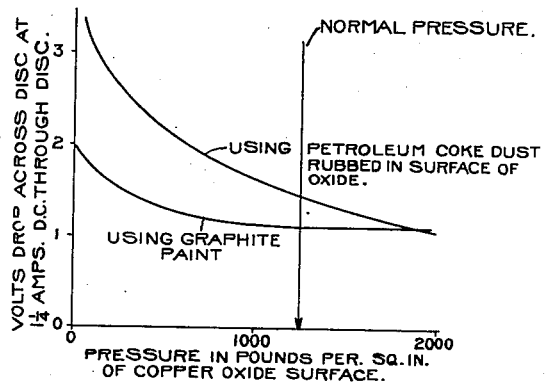
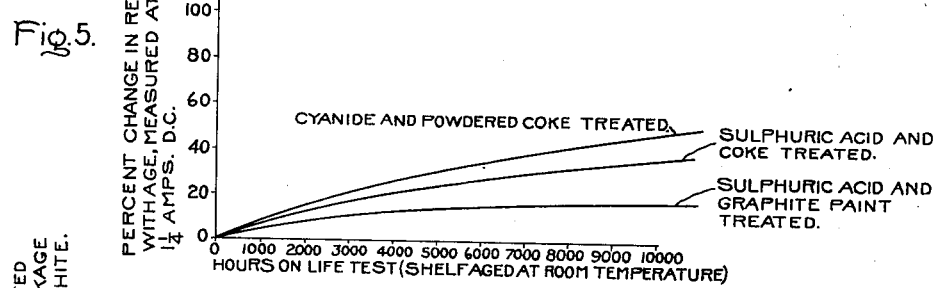
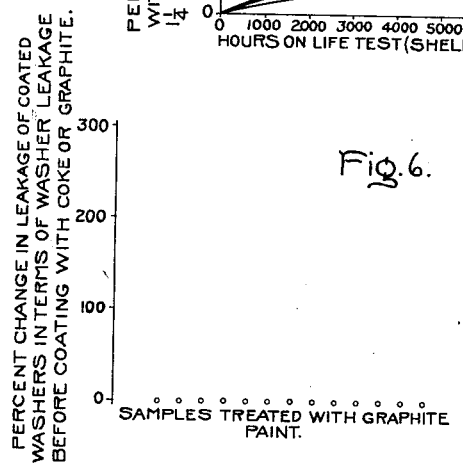
Inventor:
Edgar A. Harty,
by Harry E. Dunham
His Attorney.

Patented Oct. 18, 1938

2,133,745

UNITED STATES PATENT OFFICE 2,133,745

COPPER OXIDE RECTIFYING ELEMENT

Edgar A. Harty, Marblehead, Mass., assignor to General Electric Company, a corporation of New York Application November 19, 1935, Serial No. 50,542

10 Claims. (Cl. 175—366)

My invention relates to alternating current rectifying apparatus wherein the active rectifying elements are of the copper oxide type. The invention is particularly directed to methods of treating the copper oxide elements to remove therefrom the black cupric oxide formed on the active red cuprous oxide layer during heat treatment of the elements, and to methods of coating the red oxide surface after removal of the black oxide.

The general object of the invention is to provide a copper oxide rectifier which is characterized, as compared with previous rectifiers of this type, by higher leakage resistance, lower contact resistance, a greater uniformity in manufacture, and less change of resistance with age.

Previous processes commonly employed in the commercial production of copper oxide rectifiers from copper disks or washers have comprised, for example, the following steps: oxidizing the washers in an electric oven at 1030° C. for 10 minutes; annealing at 550° C. for 3½ minutes; quenching in water; drying; removing the black cupric oxide, formed during the oxidizing process, by a sodium cyanide treatment or by a treatment with nitric acid; washing; drying; applying a coating of pulverized carbon material, usually coke dust, to the oxide surface, to improve the contact between the oxide surface and an adjacent metal member such as a lead washer; drying; testing; and stacking for assembly into a rectifier.

Heretofore difficulties have been experienced in the above described and similar processes of forming copper oxide rectifiers, due to the use of cyanide or of nitric acid for removal of the black oxide, and to the use of the coating of pulverized carbon material for improving the contact between oxide surface and lead washer.

It has been found that the action of the cyanide is at times severe, causing the oxide crystals to crack at the edges of the element and thereby increasing the leakage. Nitric acid when employed to remove the black oxide tends to penetrate very rapidly through the red oxide film, thereby causing the disk to short circuit when placed in service. Moreover, the cyanide and nitric acid treated disks show relatively higher leakage current.

It has been found, further, that in the use of the powdered carbon material such as coke dust, non-uniformity of contact resistance between the oxide surface of the element and the lead washer or other metal member has resulted. Elements coated with this material have shown high sensitivity of the contact resistance to pressure, any variation of the pressure on the disks in the assembled rectifier being accompanied by a considerable variation in the contact resistance, the ageing of the rectifier due to diminution of the pressure on the rectifier stack with time being thereby materially increased.

In accordance with my present invention the above and other difficulties have been overcome, and advantages which will hereinafter appear have been secured in the manufacture and use of copper oxide rectifiers, by treating the oxidized elements with a sulphuric acid solution instead of with sodium cyanide or nitric acid to remove the black cupric oxide, and by coating the sulphuric acid treated oxidized elements with a special graphite paint mixture applied with a brush, instead of the powdered carbon material. In assembling the copper oxide elements and other elements into a stack or rectifier unit I have found also that suitable uniformity of pressure on the elements is materially aided by the use of a special, improved type of spring washer in place of the dished washers commonly employed for this purpose.

My invention will be better understood from the following description when considered in connection with the accompanying drawing and its scope will be set forth in the appended claims.

Referring to the drawing, Fig. 1 is a sectional view of a copper oxide rectifier unit in which my invention has been embodied; Fig. 2 is a perspective view of a spring pressure element; Fig. 3 shows curves illustrating leakage characteristics of copper oxide elements treated with cyanide, nitric acid, or sulphuric acid; Fig. 4 shows curves illustrating voltage drop characteristics of copper oxide elements coated with coke dust, or with special graphite paint; Fig. 5 shows curves illustrating ageing characteristics of copper oxide elements treated with cyanide and powdered coke, sulphuric acid and powdered coke, or sulphuric acid and the special graphite paint; and Fig. 6 illustrates graphically the per cent leakage change due to coating the copper oxide elements with coke dust, or with the special graphite paint.

In Fig. 1, a complete assembled rectifier unit or stack in accordance with my invention is shown, including copper disks or washers 10 each having on one face a red cuprous oxide layer or film 11 on which is painted a film or layer of a special graphite composition 12. The washers 10, oxide films 11 and graphite films 12 constitute active rectifier elements, spaced from each other preferably, as in usual practice, by lead disks or washers 13 which are slightly deformable under pressure and thereby improve the contact between contiguous active elements. A usual threaded rod or bolt 14 passing through the washers and insulated therefrom by an insulating sleeve 15 and insulating washers 16 may be used to maintain the washers in alignment and to hold the contacting surfaces together under a suitable relatively heavy pressure.

In order to maintain the contact pressure approximately uniform, pressure plates and spring washers are preferably employed. Heretofore such spring plates have taken the form of dished washers, which were flattened under the heavy pressure when in position in the rectifier unit. I have found that spring plates of this usual form have tended to lose their elasticity and to fail in maintaining the pressure uniform under changing temperature conditions, or whenever a slight slackening or loosening of the stack assembly had taken place, these washers of dished form tending to take a permanent set when the pressure was released. In accordance with my invention I have provided an improved spring plate illustrated by the spring washer 17 better shown in Fig. 2, wherefrom it will be seen that the washer before assembly under pressure in the rectifier is of arc or bow form. I have found that after being compressed in the unit, and made absolutely flat as indicated in Fig. 1, the washer, when the pressure is released after long periods of use, springs back to its original bow shape, such spring washer, therefore, being eminently suitable for maintaining the uniform heavy pressure required on the rectifying elements. It is desirable to insert relatively heavy metal washers 18, which are preferably of steel about ¼" in thickness, between spring washers 17 and insulating washers 16. The spring washers 17 press upon the heavy washers 18 which apply the correct uniform pressure to the stack of rectifier elements.

Referring to the process step in the manufacture of the copper oxide elements which involves treating the oxidized copper disks with sulphuric acid, the solution is preferably a normal solution of sulphuric acid in water. The solution is held at approximately 100° F. This is the basic temperature but limits of 10° F. plus or minus may be tolerated without adverse effects. The time period of the sulphuric acid treatment varies from about 4 minutes to about 6 minutes, depending on the age and strength of the solution. When the solution is new, about 4 minutes are required, and after the solution has been used so long that 6 minutes are required, the solution is discarded and a fresh solution prepared, approximately 20,000 washers being treated before a batch of solution is exhausted.

If the solution is too cold, the action on the black oxide is slow; if approximately 110° F. is exceeded, the action becomes too rapid and there is danger of obtaining too much scrap, since the acid tends to remove more oxide than it is normally required to etch away from the washer. Such excessive etching by the acid produces a so-called thin oxide washer which is liable to break down when pressure is applied during the assembly of a rectifier stack.

In general the time period of treatment of the oxidized copper rectifying elements by the sulphuric acid solution is sufficient to overcome the edge effect by healing and dissolving all broken crystals on the edges of the disks, and to increase the leakage resistance of the rectifying elements, thereby causing the leakage current of the elements to be of a relatively low value.

Referring now to the process step which involves painting the acid-treated, oxidized copper elements with a special graphite paint, the latter material consists in general of graphite powder mixed with water and milled to the proper consistency. Preferably, the material is prepared by mixing, in water, equal weights of graphite powder and of a colloidal suspension of deflocculated graphite in water, such, for example, as known under the trade name Aquadag. The mixture is placed in a mill and milled for a suitable time, for example for a period of the order of 170 hours. The resultant paint like product has the appearance of vaseline except in color which is black. The graphite paint thus produced can be and preferably is applied to the sulphuric acid-treated, copper oxide rectifier elements with a brush. After the layer of graphite paint dries it forms on the elements a durable coating resembling black paint. While I prefer to mix graphite powder with the colloidal suspension of deflocculated graphite to form the graphite paint mixture as above described, other conductive materials such as carbon, silver or copper in colloidal form may be mixed with the above-mentioned graphite colloidal suspension instead of the graphite powder.

I have found that the leakage resistance of the copper oxide elements painted with the graphite paint remains constant before and after the application of the paint. This has not been the case with the coke-dust treatment, since in applying the latter treatment extreme care has been required to prevent the leakage from increasing greatly, even over 100%, after the application of the coke dust, as compared with the leakage before the application of the coke dust.

In Fig. 3 are shown curves illustrating the leakage characteristics of three representative groups of oxidized copper rectifier elements or washers subjected respectively to three different treatments for the removal of the black oxide, the washers of one group being treated with cyanide, those of a second group with nitric acid, and those of a third group with sulphuric acid solution in accordance with my invention. Voltages ranging up to 16 volts were impressed upon the washers of each group, the resulting leakage current being registered in milliamperes. These leakage characteristic curves show that the copper oxide rectifier elements treated with the sulphuric acid solution have materially lower leakage, throughout the range of voltages impressed on the elements, than the elements treated with nitric acid and still lower leakage than the elements treated with cyanide.

In Fig. 4 are shown voltage drop characteristics, at a given current value, as 1¼ amperes, and for a wide range of pressures, through a group of sulphuric-acid treated copper oxide elements having a coating of coke dust on the oxide surface, and through a group of similar sulphuric-treated elements but having a film of the hereinabove described graphite paint on the oxide surface. The normal pressure is, for example, approximately 1250 lbs. per sq. inch of surface as indicated on the figure. These curves of Fig. 4 show that when the sulphuric-acid treated copper oxide elements which are painted with the above described graphite paint are assembled into a rectifier unit and subjected to pressure, they require very materially less pressure than do the coke-dust treated elements for a given voltage drop. Further, the curves of Fig. 4 show that in the case of the elements painted with the graphite paint, after about 750 lbs. per sq. inch is applied, any increase of the pressure has practically no effect in decreasing the voltage drop, the drop being substantially the same from 750 lbs. and on through the normal pressure point out to approximately 2000 lbs., which pressure must not be exceeded in any case to prevent cracking of the oxide film. In general, therefore, the voltage-drop vs. pressure characteristic curves of Fig. 4 show that by painting the sulphuric-acid treated elements with the graphite paint instead of with powdered carbon material, rectifier units in which the elements are incorporated are rendered less sensitive to variations in the applied pressure and therefore the ageing of such units due to loss of pressure with time is decreased materially.

In Fig. 5 is shown the effect, on the percent change in forward resistance with age, of subjecting the copper oxide elements to both the sulphuric acid treatment and the graphite paint treatment, as compared with subjecting similar elements to the cyanide treatment and the coke-dust treatment. For comparison purposes, further to illustrate the advantages of painting the elements with the graphite paint, Fig. 5 shows also the effect of employing the coke-dust treatment on elements subjected to the sulphuric acid treatment. From the curves of the latter figure it is evident that the copper oxide elements subjected both to the sulphuric acid treatment and the graphite paint treatment show materially less change in forward resistance with age than do elements treated by the old cyanide and coke dust process, and further that the use of the graphite paint instead of the coke-dust on the sulphuric acid treated elements results in lessened ageing of these latter elements.

In Fig. 6 is shown the per cent change in leakage resistance, of sulphuric-acid treated copper oxide elements after the application of the graphite paint thereto, from the leakage resistance of these elements before the application of the coating, in comparison with the per cent change in leakage resistance of similar elements coated with coke dust. From Fig. 6 it is evident that the elements which were painted with the graphite paint all showed no change in the leakage resistance after the painting process, whereas the coke-dust treated elements showed a considerable increase in the leakage resistance under conditions of best factory practice and a very large increase under careless factory practice. It is apparent, therefore, from Fig. 6 that the leakage resistance of copper oxide elements painted with the graphite paint remains constant and its value is exactly the same as the value of the leakage resistance of these elements before applying the graphite paint, but that increases, and very large variations, occur in the leakage resistance of similar elements when coated with the coke dust.

My invention has been described herein in connection with a particular embodiment for purposes of illustration. It is to be understood, however, that the invention is susceptible of various changes and modifications and that by the appended claims I intend to cover all such modifications as fall within the true spirit and scope of my invention.

What I claim as new and desire to secure by Letters Patent of the United States is:

1. The method of producing a rectifying element for copper oxide rectifiers which comprises treating said element with a sulphuric acid solution for a period of time and at a temperature sufficient to remove the layer of black cupric oxide from said element without rendering said element liable to break down under pressure.

2. The method of producing a rectifying element for copper oxide rectifiers which comprises treating said element with a sulphuric acid solution for a period of time sufficient to cause the leakage current of said rectifying element to be of a relatively low range of values, the temperature of said solution being maintained within such a range that the black cupric oxide layer on said element is removed therefrom at a rate above a predetermined minimum rate but below a maximum rate at which said element is rendered liable to break down under pressure.

3. The method of producing a rectifying element for copper oxide rectifiers which comprises treating said element with a solution of sulphuric acid at a temperature of the order of 100° F. for a period of time of the order of four to six minutes.

4. The method of producing rectifying elements for copper oxide rectifiers which comprises treating said elements with a quantity of normal solution of sulphuric acid in water at a temperature of from 90° F. to 110° F. for a period of time of about four minutes when the solution is new and increasing said period of time to about six minutes after a relatively large number of said elements have been treated with said quantity of said solution.

5. The method of producing a rectifying element for copper oxide rectifiers which comprises treating said element with a sulphuric acid solution for a period of time sufficient to reduce the leakage current of said rectifying element to a relatively low range of values, and painting the oxide surface of said rectifying element with a graphite paint, the temperature of said solution being maintained within such a range that the black cupric oxide layer on said element is removed therefrom at a rate above a predetermined minimum rate but below a maximum rate at which said element is rendered liable to break down under pressure.

6. The method of producing a rectifying element for copper oxide rectifiers which comprises treating said element with a sulphuric acid solution to remove the black oxide from said element, and coating the oxidized surface of said element with a paint-like material comprising a colloidal suspension of deflocculated graphite in water mixed with a second conductive material in colloidal form, the temperature of said solution being maintained within such a range that the black cupric oxide layer on said element is removed therefrom at a rate above a predetermined minimum rate but below a maximum rate at which said element is rendered liable to break down under pressure.

7. The method of producing a rectifier element for copper oxide rectifiers which comprises treating said element with a sulphuric acid solution to remove the black oxide from said element, and applying to the oxidized surface of said element a paint-like coating comprising a mixture of powdered graphite and a colloidal suspension of deflocculated graphite in water milled to the consistency of vaseline, the temperature of said solution being maintained within such a range that the black cupric oxide layer on said element is removed therefrom at a rate above a predetermined minimum rate but below a maximum rate at which said element is rendered liable to break down under pressure.

8. The method of producing a rectifying element for copper oxide rectifiers which comprises treating said element with a sulphuric acid solution to remove the black cupric oxide from the red cuprous oxide layer, and painting said layer with a paint composed of powdered graphite mixed with a colloidal suspension of deflocculated graphite in water, the temperature of said solution being maintained within such a range that the black cupric oxide layer on said element is removed therefrom at a rate above a predetermined minimum rate but below a maximum rate at which said element is rendered liable to break down under pressure.

9. The method of producing a rectifying element for copper oxide rectifiers which comprises treating said element with sulphuric acid solution at a temperature of the order of 100° F. for a period of time sufficient to remove the layer of black cupric oxide from said element.

10. The method of producing a rectifying element for copper oxide rectifiers which comprises treating said element with a sulphuric acid solution at a temperature of from substantially 90° F. to 110° F. for a period of time sufficient to cause the leakage current of said rectifying element to be of a relatively low range of values.

EDGAR A. HARTY.